United States Patent [19]
Merlo et al.

[11] Patent Number: 6,093,107
[45] Date of Patent: Jul. 25, 2000

[54] DRIVESHAFT WITH ANTI-DISENGAGEMENT MEANS

[75] Inventors: Ugo Merlo, Ospitale die Bollate, Italy; Dieter Heier, Gelsenkirchen, Germany; Ditmar Klischat, Velbert, Germany; Jörg Papendorf, Kürten, Germany; Gerd Sehlbach, Essen, Germany

[73] Assignee: GKN Gelenkwellenbau GmbH, Essen, Germany

[21] Appl. No.: 09/030,063

[22] Filed: Feb. 25, 1998

[30] Foreign Application Priority Data

Mar. 7, 1997 [DE] Germany ............... 197 09 282

[51] Int. Cl.[7] ............................................. F16C 3/03
[52] U.S. Cl. .................. 464/162; 464/183; 464/134; 403/109.1; 403/377
[58] Field of Search ........................ 464/162, 134, 464/113, 179, 183, 901; 403/377, 109.5, 109.1, 109.8; 74/492; 280/777

[56] References Cited

U.S. PATENT DOCUMENTS

| | | | |
|---|---|---|---|
| 1,705,625 | 3/1929 | Mitchell | 403/109.1 |
| 2,116,290 | 5/1938 | Spicer | 464/162 |
| 2,695,504 | 11/1954 | Magee | 464/162 |
| 2,696,090 | 12/1954 | Harrington | 464/162 |
| 2,810,274 | 10/1957 | Weasler | 464/162 |
| 3,167,338 | 1/1965 | Troike | 464/901 |
| 3,180,435 | 4/1965 | McHenry | 464/901 |
| 3,293,884 | 12/1966 | Grob | 464/162 |
| 3,367,141 | 2/1968 | Baughman et al. | 464/162 |
| 3,813,899 | 6/1974 | Abrahamer | 464/162 |
| 4,945,745 | 8/1990 | Bathory et al. | 72/249 |
| 5,813,794 | 9/1998 | Castellon | 403/359 |

FOREIGN PATENT DOCUMENTS 1126071 9/1968 United Kingdom .............. 464/162

*Primary Examiner*—Terry Lee Melius
*Assistant Examiner*—Kenneth Thompson
*Attorney, Agent, or Firm*—Harness, Dickey & Pierce, P.L.C.

[57] ABSTRACT

A drive aft has two universal joints. The universal joint (1) is connected to a sliding sleeve (9). The other universal joint carries a sliding journal (8). The sliding journal (8) and the sliding sleeve (9) engage one another in a rotationally fast way via teeth (11, 22). The teeth (11, 22) are longitudinally displaceable relative to one another in the direction of a longitudinal axis (10). In order to prevent the driveshaft, in the fitted condition, from falling apart after having suffered a fracture, an anti-disengagement member is provided. The member includes an annular stop (13) arranged at the end of the sliding journal (8). The stop (13) may be fitted through an aperture (15) in the joint yoke (4) of the first universal joint (1). The stop (13) stops against a suitable face of the inner longitudinal teeth (22) when the sliding sleeve (9) and the sliding journal (8) are moved apart by a change in length distance (16).

10 Claims, 5 Drawing Sheets

DRIVESHAFT WITH ANTI-DISENGAGEMENT MEANS

BACKGROUND OF THE INVENTION

The invention relates to a driveshaft with two universal joints and an intermediate shaft connecting the two universal joints. Each of the two universal joints comprises a first joint yoke with a connecting member, a second joint yoke connected to a component of the intermediate shaft, and a cross member. The cross member articulatably connects a first and a second joint yoke. The intermediate shaft comprises at least one sliding journal. The sliding journal has outer longitudinal teeth. A sliding sleeve, with an inner bore having longitudinal teeth mating with the outer longitudinal teeth, is provided on the journal. The mating teeth enable changes in the distance between the two universal joints along a longitudinal axis. The sliding sleeve, towards the second joint yoke to which it is connected, comprises a bore portion whose cross-section is increased relative to the inner longitudinal teeth.

A relevant driveshaft is described in DE 40 38 882 C2, published Oct. 22, 1992. The sliding sleeve and the sliding journal can be disengaged and are completely freely adjusted relative to one another. To prevent disengagement during transport, a securing member is provided. The securing member has plate metal brackets fixed to the above-mentioned parts and a securing wire connecting the two parts. The plate metal brackets simultaneously serving as balancing weights.

These driveshafts are used in a large number of different applications including vehicles, railcars or commercial vehicles. If the driveshaft is not mounted in the driveline, it can be pulled apart. In order to transport the driveshaft from the place of production to the place of installation, the above-mentioned securing means is provided to protect the driveshaft during transport.

A catching bracket is used in driveshafts in vehicles, such as railcars, where high loads are likely to occur. The catching bracket is provided in the event a fracture occurs in a predetermined nominal fracture region between the gearbox and driveshaft. The driveshaft, which is separated from the end to be driven, because of the continuing connection at one end, continues to rotate briefly until the vehicle stops. However, because of the rotation and the active inertia forces, it is possible for the driveshaft to be separated in the region of the intermediate shaft. Thus, the driveshaft part still connected to the driveline remains at the latter while the part no longer connected is thrown off, which may lead to damage.

DE 33 26 990 A1, published Feb. 7, 1985, describes an assembly with a constant velocity plunging joint and a shaft. The inner part of the constant velocity plunging joint not only carries out angular movements relative to the outer part, which is held by balls accommodated in tracks of the inner part and in a cage, but also axial movements relative to the outer part. Since the displacement path is limited, an additional adjustment facility between the shaft and the inner part is provided to compensate for any installation tolerances. The shaft includes a set of outer teeth and stops for this purpose. Via the outer teeth, the shaft is positioned in a toothed bore of the inner part. The stops limit the adjustment of the shaft relative to the inner part. Furthermore, one of the stops is a friction element. The stop enables the shaft to be adjusted relative to the inner part only if the shaft is subjected to a force which exceeds the force required for the standard adjustment movements between the outer part and inner part. The connection between the inner part and shaft is intended for setting purposes only and is only adjusted in exceptional cases.

SUMMARY OF THE INVENTION

It is an object of the invention to propose a driveshaft which is intentionally separated in the region of the intermediate shaft.

In accordance with the invention, at the end of the sliding journal, a stop is provided which is disconnectably fixed. The outer diameter of the shaft is greater than the major diameter of the inner longitudinal teeth of the sliding sleeve. The end of the sliding journal which includes the stop is positioned in the increased bore portion. The stop is arranged in a contact-free way in the increased bore portion.

The advantage of this solution is that the sliding sleeve and the sliding journal are effectively held together. Also, anti-disengagement means is present to accommodate higher forces.

According to a further embodiment of the invention, the stop is in the form of a ring. The second joint yoke comprises an axial aperture centered on the longitudinal axis. The second joint yoke is open towards the sliding sleeve. The aperture has a cross-section adapted to the outer contour of the annular stop.

In case there is a need for dismantling, the dismantling procedure is not a problem because of the accessibility of the fixing means for the stop. The annular stop can be introduced and extracted through the aperture of the second joint yoke connected to the sliding sleeve, towards the seat portion of the sliding journal in order to achieve a connection between same or a disconnection of same.

According to a further embodiment of the invention, the sliding journal has a seat portion on which the annular stop is held by a securing ring. After the annular stop has been slid on to the seat portion, the securing ring is fitted. The securing ring is inserted through the aperture in the second joint yoke.

A particularly advantageous assembly operation is achieved in that, in the case of the shortest possible distance between the two universal joints, the sliding journal, together with the seat portion receiving the annular stop, extends into the aperture of the second joint yoke connected to the sliding sleeve.

This measure simplifies assembly in that it is easy to insert the annular stop. The stop is introduced through the aperture in the direction of the seat portion. Also, during assembly, the stop is prevented from falling into the enlarged bore portion of the sliding sleeve. This measure also makes the assembled unit more secure. When the stop is fitted, it is possible to mount the securing ring. The securing ring cannot be moved past the stop as the latter takes up the entire diameter of the aperture.

To prevent the stop from being deformed when stopping against the end faces of the inner longitudinal teeth, which end faces point to the enlarged bore portion, it is proposed that towards the inner longitudinal teeth, the stop comprises a contact face. The contact face establishes planar contact with the face of the teeth of the inner longitudinal teeth. The inner longitudinal teeth face points towards the stop ring.

To prevent any lubricant from emerging in the region of the intermediate shaft, the aperture is associated with a cover. The aperture is closable by the cover. In a preferred embodiment, the cover is additionally associated with a seal. Furthermore, the cover may include a centrally arranged lubricating nipple which is used to supply the pair of teeth with lubricant.

For a second embodiment of the anti-extraction means in accordance with the invention, the second joint yoke comprises a bore. The bore is centered on the longitudinal axis. The stop is arranged at one end of a coupling bar. The other end of the coupling bar is provided with an outer thread which extends through the bore of the second joint yoke. The bar end projecting from the bore includes a threaded-on nut to tension the coupling bar relative to the sliding journal.

The coupling bar preferably has a plurality of parts a stop element comprising the stop and a central bore, a tubular bar element and a threaded sleeve coupled with the outer thread. The components are connected to one another by welding. A lubricating nipple is provided to centrally lubricate the pair of teeth. The threaded sleeve has a bore with an inner thread. The lubricating nipple is threaded into the thread.

The stop element has a conical centering face to centrally fix the stop element relative to the sliding journal. The conical face is received, in a centered way, in a conical centering bore at the end of the sliding journal. The threaded sleeve and the threaded-on nut achieve a tensioning effect. The stop element is displaced in the sense of tensioning same towards the second joint yoke of the first joint.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment is diagrammatically illustrated in the drawing wherein.

DETAILED DESCRIPTION OF THE DRAWINGS

Figure 1:
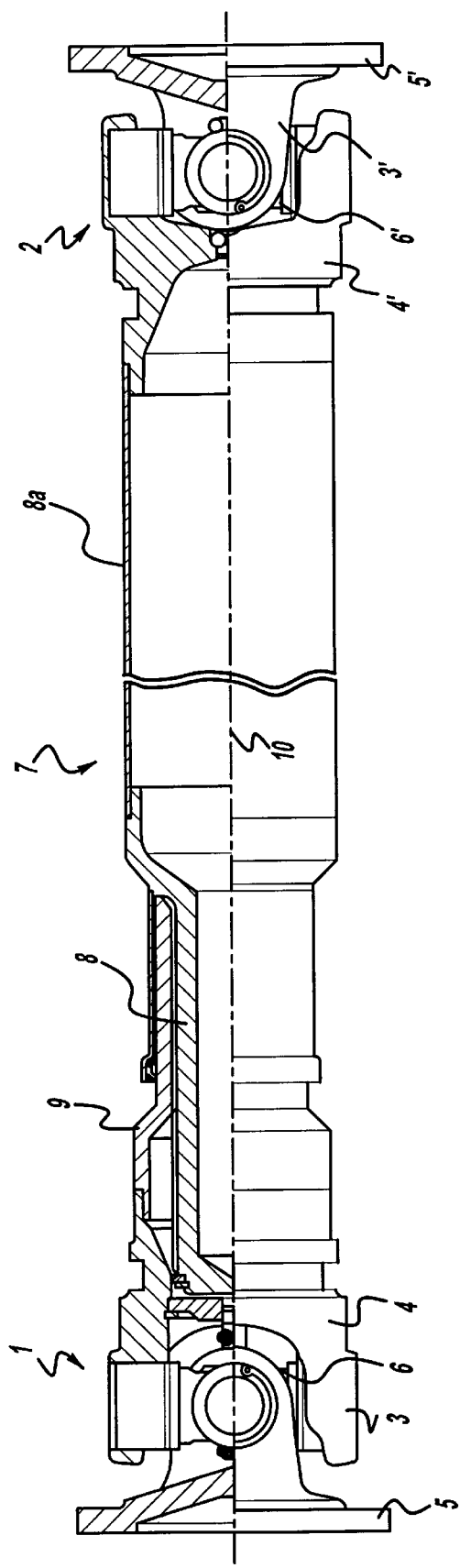
FIG. 1 is a half longitudinal view through a driveshaft in accordance with the invention.

The first driveshaft embodiment illustrated in FIG. 1 comprises a first joint 1 and a second joint 2. The first joint 1 has a first joint yoke 3 which carries a flange 5. The flange 5 constitutes the connecting means for a driving component of a component to be driven. Furthermore, the first joint 1 has a second joint yoke 4. The two joint yokes 3, 4 are articulatably connected to one another by a cross member 6.

The second joint 2 has a first joint yoke 3' which is also provided with a flange 5'. The flange 5' constitutes the connecting means to establish a connection with a driving or driven part of a driveline. The second joint 2 includes a second joint yoke 4'. Again, the two joint yokes 3', 4' are articulatably connected to one another by a cross member 6'.

An intermediate shaft 7 connects the first and second joints. The intermediate shaft includes a sliding journal 8. The sliding journal 8, via connected tube 8a, is firmly secured to a projection of the second joint yoke 4' of the second joint 2. The sliding journal 8 is displaceably received in a sliding sleeve 9. The sliding sleeve 9 is firmly connected to the second joint yoke 4 of the first joint 1. The sliding journal 8 and the sliding sleeve 9 are displaceable inside one another along the longitudinal axis 10. The adjustability enables the distance to change between the two joints 1, 2.

Figure 2:
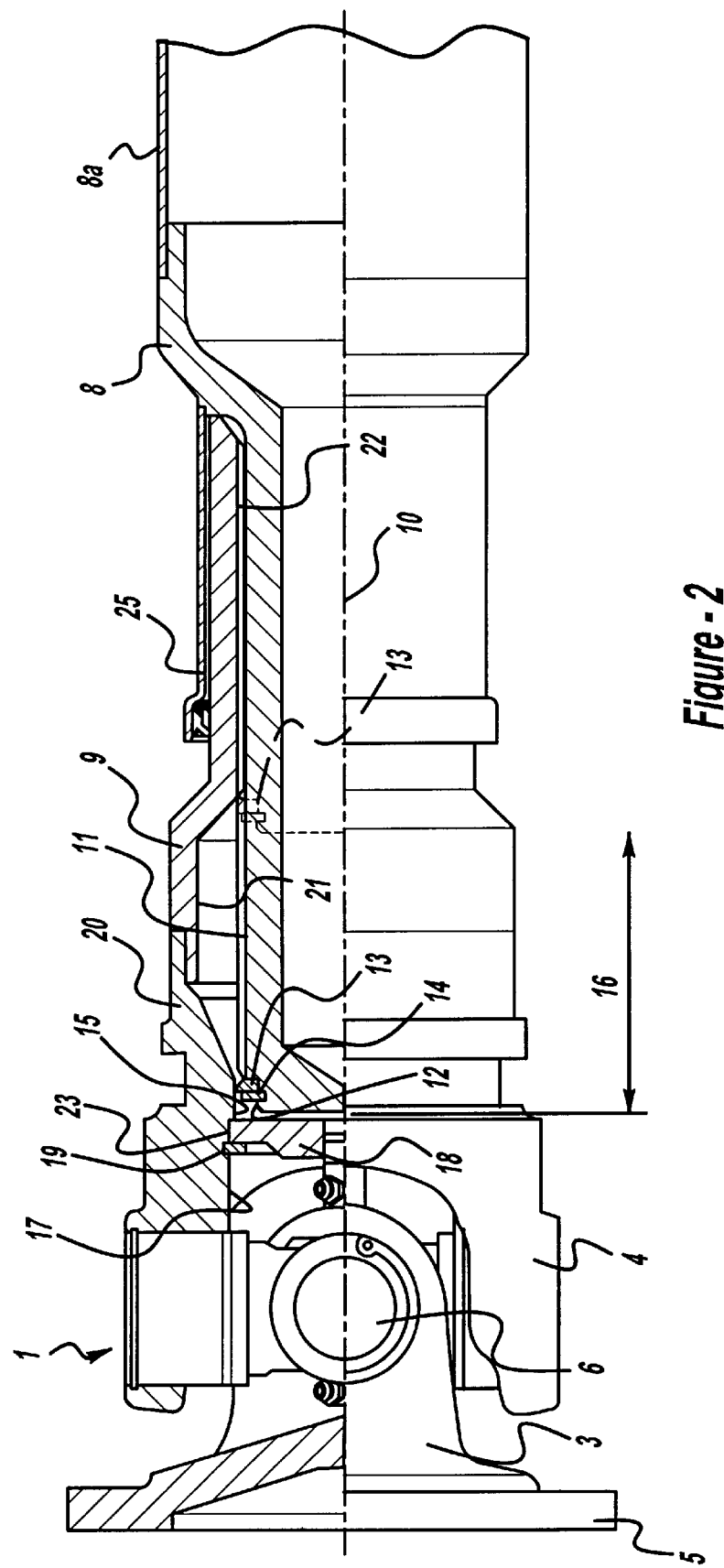
FIG. 2 is an enlarged view of the driveshaft of FIG. 1.

FIG. 2 is an enlarged view of FIG. 1 showing part of the driveshaft illustrated in FIG. 1. The first joint 1 includes the first joint yoke 3 with the flange 5, the second joint yoke 4 and the cross member 6. A projection 20 which defines an enlarged bore is formed on to the second joint yoke 4.

The sliding journal 8 is provided with outer longitudinal teeth 11 which extend parallel to the longitudinal axis 10. The sliding journal 8 is shown in its furthest possible inserted position in the inner longitudinal teeth 22 of the sliding sleeve 9.

An annular stop 13 is associated with an end of the sliding journal 8 facing the first joint 1. The stop 13 is held on the seat portion 12 of the sliding journal 8 by a securing ring 14. The ring 14, in FIG. 2, is positioned within an aperture 15 of the second joint yoke 4. Also, the stop 13, by means of its cylindrical outer contour, is positioned within the aperture 15. The aperture 15 defines a cylindrical bore.

The sliding journal 8, relative to the sliding sleeve 9, covers a path 16 with a changing length. The end of the sliding journal 8 moves to the right from the position illustrated in continuous lines to the position shown in dashed lines in FIG. 2. The stop 13 does not contact bore portion 21 of sliding sleeve 9. The stop 13 approaches the face 26 (shown in FIG. 4) at the end of the teeth 22. The stop 13 contacts teeth 22 in a planar way, so that both parts, the sliding sleeve 9 and the sliding journal 8, are no longer displaced relative to one another to increase the distance between the two joints 1, 2.

Toward the cross member 6, in front of the aperture 15, the second joint yoke 4 includes an enlarged bore step 17. A cover 18 is inserted in bore 17. The cover 18 is sealed by a seal 23 and secured in its position by a securing ring 19. Also, a sealing sleeve 25 is between the sliding sleeve 9 and the sliding journal 8 to seal the system.

Figure 3:
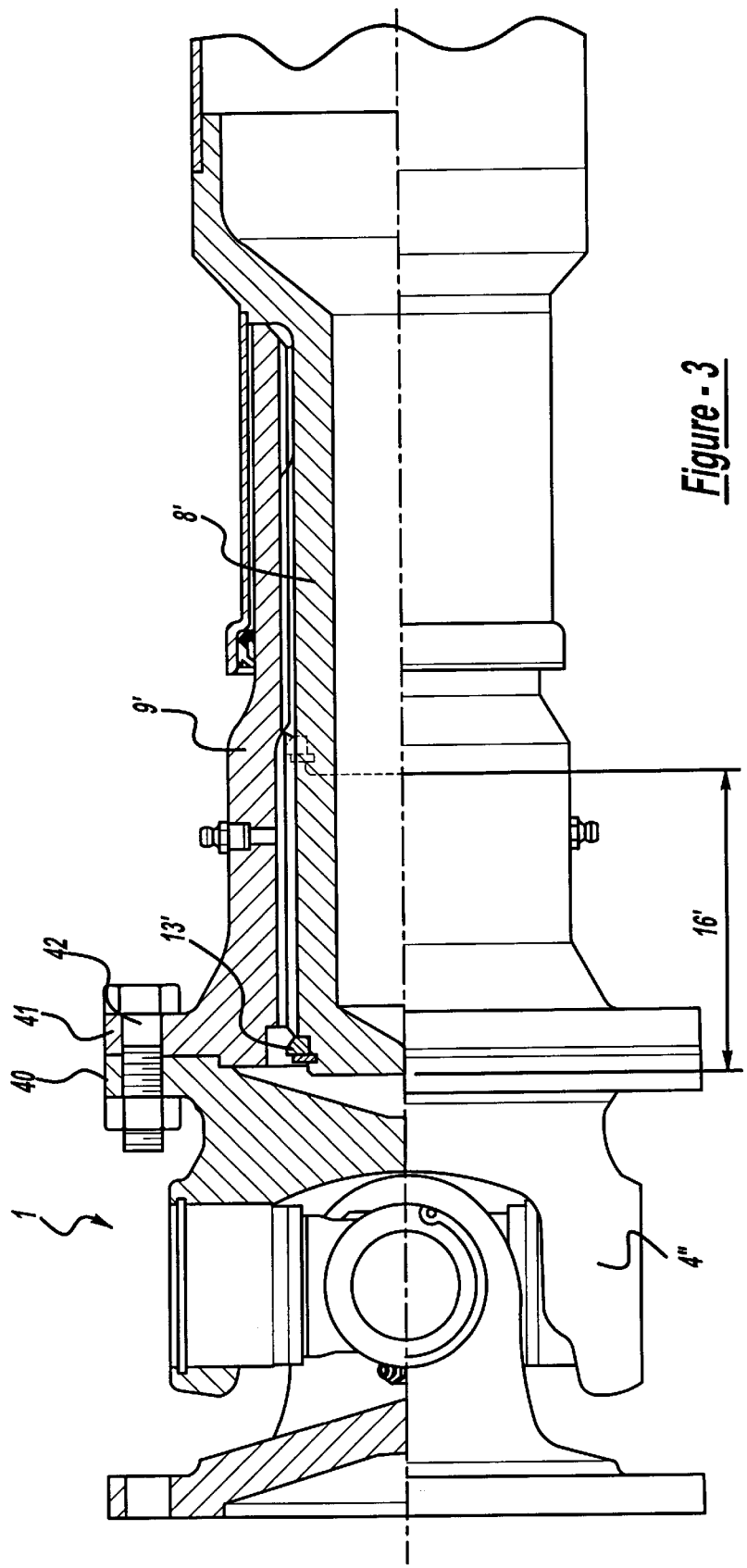
FIG. 3 is a view like FIG. 2 of a driveshaft of a modified embodiment.

The driveshaft shown in FIG. 3 deviates from the embodiment illustrated in FIGS. 1 and 2. Here, the sliding sleeve 9' and the second joint yoke 4" of the first joint 1' are separate components. Each component has a flange 40, 41 which are connected to one another by bolts 42. The sliding journal 8' carries an annular stop 13'. The stop 13' is designed and arranged as shown in FIGS. 1 and 2. Thus, only a maximum change in length 16' is achievable, in which context the stop 13' becomes effective. The stop 13' is fitted before the two flanges 40, 41 are connected to one another.

Figure 4:
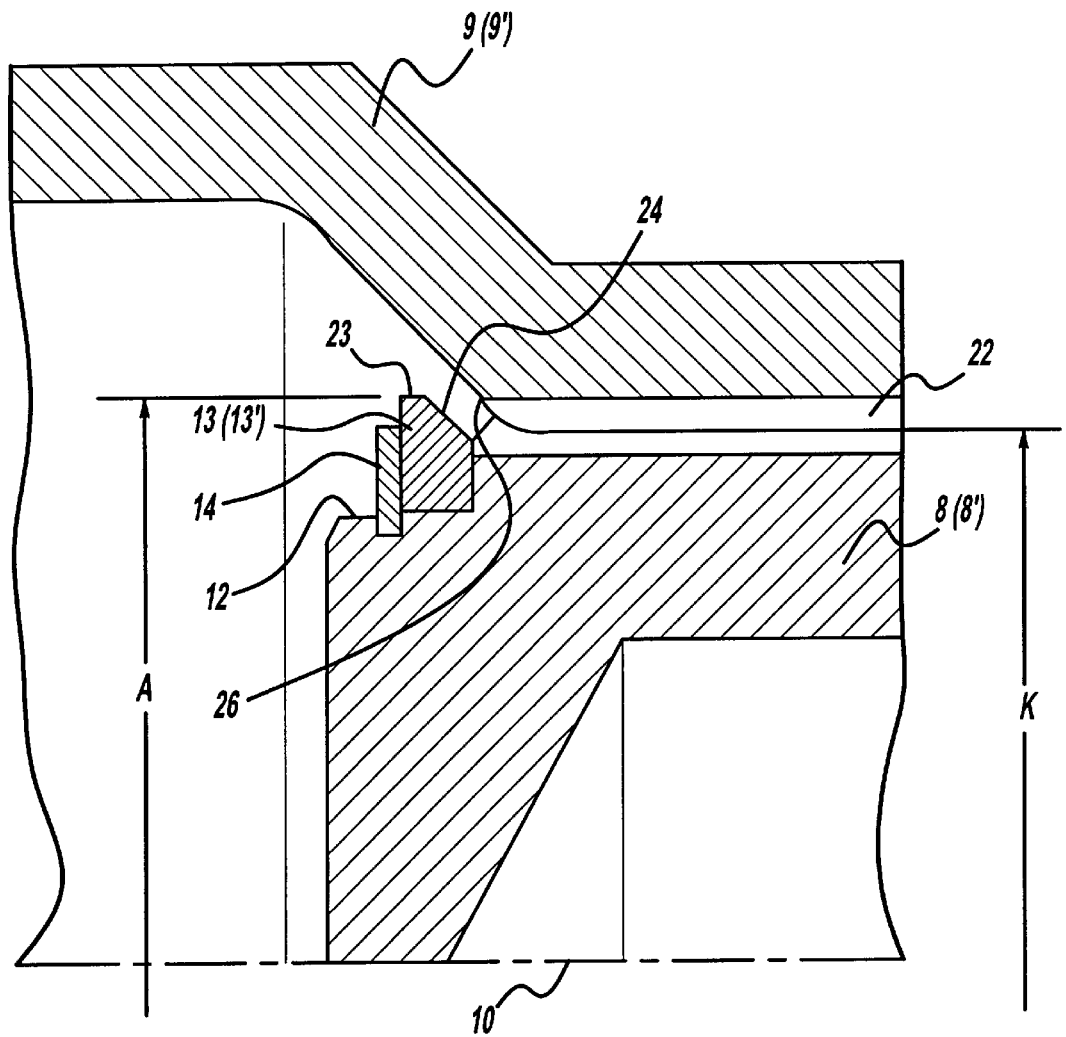
FIG. 4 is an enlarged view of an annular stop associated with the inner longitudinal teeth of a sliding sleeve.

FIG. 4 shows a simplified form of an embodiment according to FIGS. 1-3. Here, the annular stop 13 has a cylindrical outer contour 23 with the diameter A. The annular stop 13 also defines a bore which enables the stop 13 to be received on the seat portion 12. Furthermore, the stop 13 has a substantially conical contact face 24 which cooperates with the corresponding face 26 at the end of the teeth 22. To provide effective anti-disengagement means, the outer diameter A is greater than the major diameter K of the inner longitudinal teeth 22.

Figure 5:
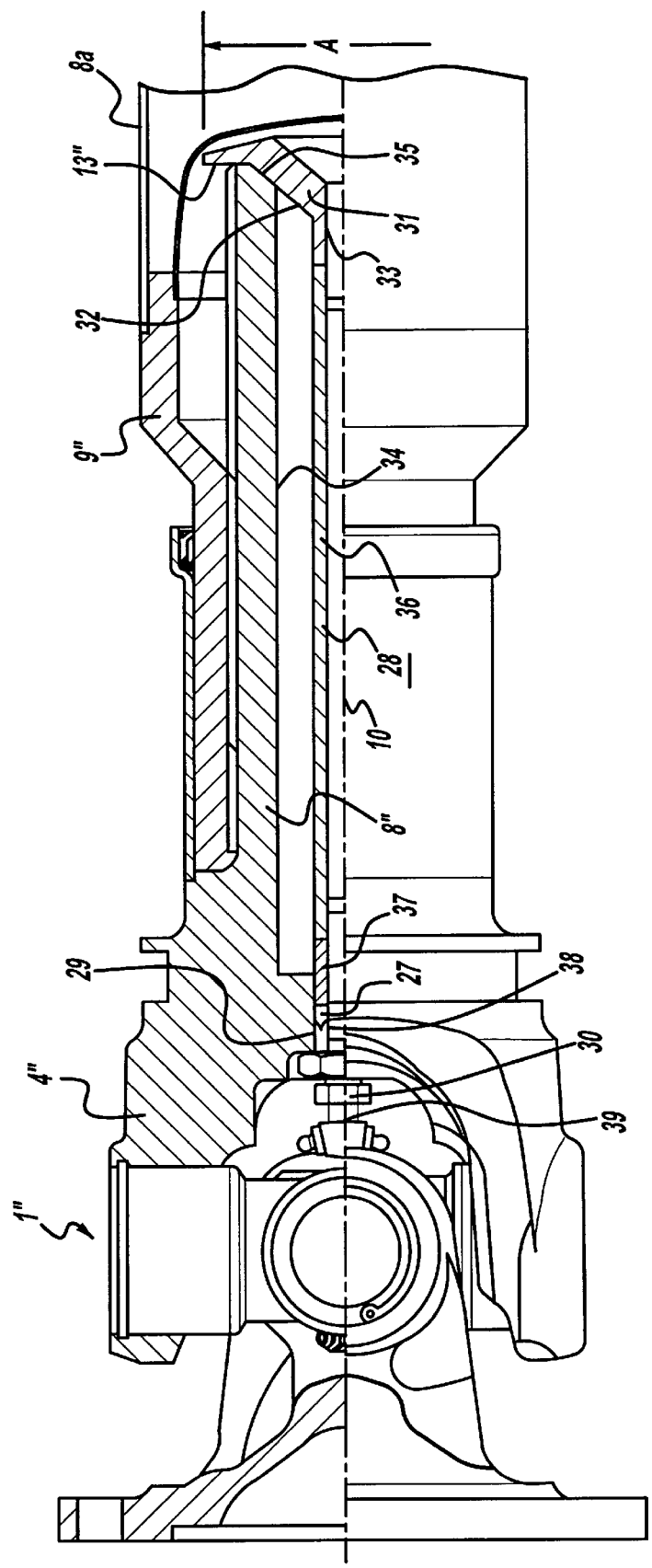
FIG. 5 is a view like FIG. 2 of a driveshaft of another embodiment of the present invention.

FIG. 5 is another embodiment of a driveshaft. The second joint yoke 4''' of the first joint 1" is associated with the sliding journal 8". The joint yoke 4''' is provided with a bore 34. The second joint yoke 4''' is also provided with a bore 27 which connects the bore 34 with the outer environment. The sliding journal 8" through teeth 22 engages the toothed bore of the sliding sleeve 9". A tube firmly connects the sliding sleeve 9" to a second joint yoke of a further joint (not illustrated).

The stop 13" is associated with a multi-component coupling bar 28. The coupling bar 28 includes a stop element 31 which is associated with the stop 13". A tubular bar element 36 is firmly connected to the sop element 31. Also, a threaded sleeve 37 is firmly attached to the element 36. The stop element 31 includes a portion with a conical centering face 32. The centering face 32 is held in a centered way in a conical centering bore 35 at the free end of the sliding journal 8". A radially extending portion of the stop element 31 starts from the conical centering bore 35. The face of the radially extending portion pointing to the first joint 1" forms stop 13". Stop 13" is plate-like in shape and has an outer diameter A which is greater than the major diameter of the teeth of the sliding sleeve 9". Thus, the face stops against the teeth when the shaft is pulled apart. Also, the outer diameter A is smaller than the increased diameter bore portion of the sliding sleeve 9".

Furthermore, the stop element 31 has a central bore 33. The diameter of the central bore 33 corresponds to that of the bore of the adjoining tubular bar element 36. The adjoining threaded sleeve 37 comprises a portion with a cylindrical outer face which is accommodated in the bore 27 of the second joint yoke 4'". Also, sleeve 37 includes a portion with an outer thread 29, which projects from the bore 27. A nut 30, which tensions the coupling bar 28 relative to the sliding journal 8", is threaded on to the outer thread 29. Furthermore, the threaded sleeve 37 has a bore with an inner thread 28. A lubricating nipple 39 is threaded in bore 28 to lubricate the teeth of the sliding sleeve 9" and sliding journal 8". The coupling bar 28 is mounted before the sliding sleeve 9" is welded to the tube 8a, which connects the sliding sleeve with the further joint or before the tube 8a is welded to the further joint.

While the above detailed description describes the preferred embodiment of the present invention, the invention is susceptible to modification, variation and alteration without deviating from the scope and fair meaning of the subjoined claims.

What is claimed is:

1. A driveshaft with two universal joints and an intermediate shaft connecting the two universal joints, each of the two universal joints comprising:

a first joint yoke with connecting means;

a second joint yoke connected to a component of the intermediate shaft;

a cross member articulatably connecting a first and a second joint yoke said intermediate shaft comprising at least one sliding journal provided with outer longitudinal teeth and a sliding sleeve which is provided with a bore with inner longitudinal teeth mating with the outer longitudinal teeth, the sliding journal moving relative to the sliding sleeve to enable changes in the distance between the two universal joints along a longitudinal axis;

the sliding sleeve, towards the second joint yoke to which it is connected, comprising a bore portion with an increased cross-section relative to the longitudinal teeth;

a stop at the end of the sliding journal, said stop disconnectably fixed and having an outer diameter greater than a major diameter of the inner longitudinal teeth of the sliding sleeve; and the end of the sliding journal including the stop is positioned in the increased bore portion in a contact-free way in the increased bore portion.

2. A driveshaft according to claim 1, wherein the stop is a ring, the second joint yoke having an axial aperture centered on the longitudinal axis and which is open towards the sliding sleeve and said aperture having a cross-section which is adapted to the outer contour of the annular stop.

3. A driveshaft according to claim 2, wherein the sliding journal having a seat portion on which the annular stop is held by a securing ring.

4. A driveshaft according to claim 3, wherein in the case of the shortest possible distance between the two universal joints, the sliding journal, together with the seat portion receiving the annular stop, extends into the aperture of the second joint yoke connected to the sliding sleeve.

5. A driveshaft according to claim 2, wherein towards the inner longitudinal teeth, the annular stop having a contact face which establishes planar contact with a face of the teeth, said face points towards the stop ring.

6. A driveshaft according to claim 2, wherein said aperture is closable by a cover.

7. A driveshaft according to claim 1, wherein the second joint yoke comprises a bore centered on the longitudinal axis, said stop arranged at one end of a coupling bar, an other end of the bar is provided with an outer thread which extends through a bore of the second joint yoke, said bar other end projecting from the bore being provided with a threaded-on nut for tensioning the coupling bar relative to the sliding journal.

8. A driveshaft according to claim 7, wherein the coupling bar includes a stop element with the stop, a central bore, a tubular bar element, and a threaded sleeve with an outer thread.

9. A driveshaft according to claim 8, wherein the threaded sleeve comprises a bore with an inner thread for receiving a lubricating nipple.

10. A driveshaft according to claim 8, wherein the stop element comprises a portion with a conical centering face which, in a centered way, is received in a conical centering bore at the end of the sliding journal.

* * * * *

UNITED STATES PATENT AND TRADEMARK OFFICE
CERTIFICATE OF CORRECTION

PATENT NO. : 6,093,107
DATED : July 25, 2000
INVENTOR(S) : Ugo Merlo et al.

It is certified that error appears in the above-identified patent and that said Letters Patent is hereby corrected as shown below:

<u>Title page,</u>
Item [57], in the ABSTRACT, line 1, delete "drive aft" and substitute therefor
-- driveshaft --

<u>Column 3,</u>
Line 44, delete "DETAILED DESCRIPTION OF THE DRAWINGS" and substitute therefor -- DETAILED DESCRIPTION OF THE PREFERRED EMBODIMENTS --

<u>Column 5,</u>
Line 1, delete "sop" and substitute therefor -- stop --

Signed and Sealed this

Second Day of July, 2002

*Attest:*

JAMES E. ROGAN
*Attesting Officer*  *Director of the United States Patent and Trademark Office*